United States Patent
Gonzalez et al.

(10) Patent No.: US 10,440,593 B2
(45) Date of Patent: Oct. 8, 2019

(54) PROVIDING SPECIAL RADIO PROVISIONS TO LINK BUDGET LIMITED USER EQUIPMENT AT ACTIVATION

(71) Applicant: Apple Inc., Cupertino, CA (US)

(72) Inventors: Francisco J. Gonzalez, San Jose, CA (US); Rafael L. Rivera-Barreto, Santa Clara, CA (US); Rohan C. Malthankar, San Jose, CA (US); Sarma V. Vangala, San Jose, CA (US); Tarik Tabet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/414,377

(22) Filed: May 16, 2019

(65) Prior Publication Data

US 2019/0274057 A1    Sep. 5, 2019

Related U.S. Application Data

(62) Division of application No. 15/961,779, filed on Apr. 24, 2018, which is a division of application No. (Continued)

(51) Int. Cl.
*H04W 24/02* (2009.01)
*H04W 76/10* (2018.01)
(Continued)

(52) U.S. Cl.
CPC ............ *H04W 24/02* (2013.01); *H04B 1/385* (2013.01); *H04L 67/303* (2013.01); *H04W 8/04* (2013.01);
(Continued)

(58) Field of Classification Search
CPC . H04W 4/005; H04W 52/0216; H04W 76/02; H04W 8/24; H04W 12/06;
(Continued)

(56) References Cited

U.S. PATENT DOCUMENTS

| 7,336,638 B2 | 2/2008 | Cheng et al. |
| 8,797,989 B2 | 8/2014 | Lee et al. |

(Continued)

FOREIGN PATENT DOCUMENTS

| CN | 102301674 A | 12/2011 |
| CN | 103477697 A | 12/2013 |

(Continued)

OTHER PUBLICATIONS

International Search Report and Written Opinion, Application No. PCT/US2017/028145, dated Jul. 27, 2017, 13 pages.
(Continued)

*Primary Examiner* — Nam T Huynh
(74) *Attorney, Agent, or Firm* — Meyertons Hood Kivlin Kowert and Goetzel PC; Jeffrey C. Hood; Matthew C. Washburn

(57) ABSTRACT

System and methods for providing special radio provisions to link budget limited devices. Before establishing a cellular connection with a cellular network, a user equipment device (UE), such as a link budget limited UE, may negotiate the special radio provisions with the network by presenting requested profile information to the network, and receiving back approved profile information from the network. The UE may perform these communications either directly, via a non-cellular communication connection with the network, or indirectly, via a companion or proxy device. When the UE initiates a cellular connection with the network, both entities may use information specified in the approved profile information, which may improve efficiency of the connection. In some scenarios, the approved profile information may identify a class of devices to which the UE belongs. The approved profile information may also be used in establishing connections with other devices of the same class.

20 Claims, 5 Drawing Sheets

Related U.S. Application Data

15/169,400, filed on May 31, 2016, now Pat. No. 9,986,446.

(51) Int. Cl.
*H04W 8/04* (2009.01)
*H04W 28/18* (2009.01)
*H04L 29/08* (2006.01)
*H04B 1/3827* (2015.01)
*H04W 74/00* (2009.01)
*H04W 88/06* (2009.01)

(52) U.S. Cl.
CPC ........... *H04W 28/18* (2013.01); *H04W 76/10* (2018.02); *H04W 74/006* (2013.01); *H04W 88/06* (2013.01)

(58) Field of Classification Search
CPC . H04W 28/18; H04W 52/0235; H04W 60/04; H04W 72/02
See application file for complete search history.

(56) References Cited

U.S. PATENT DOCUMENTS

| | | |
|---|---|---|
| 9,049,666 B2 | 6/2015 | Charbit et al. |
| 9,572,184 B1 | 2/2017 | Erdogan |
| 9,603,151 B2 | 3/2017 | Rune |
| 2013/0203455 A1 | 8/2013 | Takano |
| 2017/0195868 A1 | 7/2017 | Kotecha |

FOREIGN PATENT DOCUMENTS

| | | |
|---|---|---|
| GB | 2530566 A | 3/2016 |
| WO | WO 2011/100540 | 8/2011 |
| WO | WO 2014/003436 | 1/2014 |
| WO | 2015070903 | 5/2015 |
| WO | WO 2015/071025 A1 | 5/2015 |
| WO | WO 2016/047106 | 3/2016 |

OTHER PUBLICATIONS

Notice of Allowance, Korean Patent Application No. 10-2018-7034325, dated Dec. 20, 2018, two pages.

SONY; "Scope and phasing of D2D Relay enhancements"; 3GPP TSG RAN WG2 Meeting#94: R2-163936: May 13, 2106: pp. 1-8.
Notice of Allowance, Japanese Patent Application No. 2018-562156, dated May 28, 2019, three pages.

Office Action, Chinese Application for Invention No. 201780033608.6, dated Jul. 23, 2019; 12 pages.

US 10,440,593 B2

PROVIDING SPECIAL RADIO PROVISIONS TO LINK BUDGET LIMITED USER EQUIPMENT AT ACTIVATION

PRIORITY CLAIM

This application is a divisional of and claims priority to U.S. patent application Ser. No. 15/961,779, entitled "Providing Special Radio Provisions to Link Budget Limited User Equipment at Activation," filed Apr. 24, 2018, which is a divisional of and claims priority to U.S. patent application Ser. No. 15/169,400, now U.S. Pat. No. 9,986,446, having the same title, filed May 31, 2016, all of which are hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer, and the cited references that it was made to avoid, may need to be revisited. Further, any disclaimer made in the instant application should not be read into or against the parent application or other related applications.

FIELD

The present application relates to wireless communication, including efficiently establishing a cellular network connection for a link budget limited cellular communication device.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices are a newer form of mobile electronic device, one example being smart watches. Certain types of mobile electronic devices, such as wearable devices, commonly have had limited wireless communications capabilities and may have been capable of communicating only over wired interfaces or short-range point-to-point technologies. Wearable devices typically have smaller batteries than larger portable devices, such as smart phones and tablets. Wearable devices also may have different thermal characteristics that larger devices, e.g., because of their small size.

It would be desirable for wearable devices and other limited mobile devices to provide communications capabilities similar to those of smart phones. Thus, improvements in the field are desirable.

SUMMARY

Embodiments are presented herein of, inter alia, a system and associated methods for providing special radio provisions to link budget limited user equipment, such as at activation.

A user equipment device (UE) is disclosed, the UE including: a cellular radio configured to communicate with a base station of a cellular communication network using a cellular communication protocol; at least one processor communicatively coupled to the cellular radio; and at least one memory. The at least one memory may store a device class identifier indicating that the UE belongs to a first device class. The at least one memory may further include software instructions executable by the at least one processor, wherein the software instructions, when executed by the at least one processor, cause the UE to receive, from the cellular communication network, values of one or more cellular connection settings for a cellular connection between the UE and the base station, wherein the received values of the one or more cellular connection settings may be configured to improve efficiency of establishing a cellular connection between the base station and a device belonging to the first device class. The software instructions may be further executable to cause the UE to transmit a connection initiation request including the device class identifier to the base station to establish a cellular connection using cellular connection settings based on the values of the one or more cellular connection settings previously received from the cellular communication network.

In some embodiments, the UE may further include a non-cellular radio communicatively coupled to the at least one processor, the non-cellular radio configured to communicate with the cellular communication network using a non-cellular communication protocol. Receiving the values of one or more cellular connection settings may be performed via the non-cellular radio. The software instructions may be further executable to cause the UE to: transmit, to the cellular communication network, via the non-cellular radio, requested values of the one or more cellular connection settings, wherein the received values are based on the requested values. In some cases, at least one of the approved values for a first cellular connection setting may be the same as the requested value for the first cellular connection setting. In some cases, at least one of the approved values for a first cellular connection setting may be different than the requested value for the first cellular connection setting.

In some embodiments, the UE may further include a non-cellular radio communicatively coupled to the at least one processor, the non-cellular radio configured to communicate, using a non-cellular communication protocol, with a companion device associated with the UE, wherein the companion device is configured to obtain the values of the one or more cellular connection settings from the cellular communication network. The receiving the values of one or more cellular connection settings may be performed via the companion device. The software instructions may be further executable to cause the UE to transmit, to the companion device, via the non-cellular radio, requested values of the one or more cellular connection settings, wherein the received values are based on the requested values.

A method for establishing a cellular network connection for a link budget limited cellular communication device is disclosed. The link budget limited cellular communication device may communicate to a cellular communication network, prior to transmitting a connection initiation request to the cellular communication network, requested values of one or more cellular connection settings for a cellular connection between the cellular communication network and the link budget limited cellular communication device. The link budget limited cellular communication device may also receive from the cellular communication network, prior to transmitting the connection initiation request to the cellular communication network, approved values for the one or more cellular connection settings. The link budget limited cellular communication device may also transmit, after said communicating the requested values and after said receiving the approved values, the connection initiation request to the cellular communication network to establish a cellular connection using cellular connection settings based on the approved values.

In some embodiments, the approved values may be determined by the cellular communication network in response to the cellular communication network receiving the requested values of the one or more cellular connection settings from the link budget limited cellular communication device.

In some cases, at least one of the approved values for a first cellular connection setting may be the same as the requested value for the first cellular connection setting. In some cases, at least one of the approved values for a first cellular connection setting may be different than the requested value for the first cellular connection setting.

In some embodiments, communicating to the cellular communication network may include the link budget limited cellular communication device communicating the requested values of the one or more cellular connection settings to a provisioning server, and the provisioning server communicating the requested values of the one or more cellular connection settings to a Home Subscriber Server (HSS). The approved values may be determined by the HSS.

In some embodiments, the requested values may be selected to improve efficiency of establishing the cellular connection between the cellular communication network and the link budget limited cellular communication device.

In some embodiments, the communicating to the cellular communication network and the receiving from the cellular communication network may be performed over a non-cellular connection.

In some embodiments, the communicating to the cellular communication network and the receiving from the cellular communication network may be performed via a mobile device acting as a proxy for the link budget limited device, wherein the mobile device has a previously established cellular connection with the cellular communication network.

A base station of a cellular communication network is disclosed, the base station including: at least one radio configured to communicate with a user equipment device (UE); at least one processor communicatively coupled to the at least one radio; and at least one memory. The at least one memory may store a device class profile including an identifier of a device class and one or more cellular connection settings to be used in configuring a cellular connection between the base station and a device of the identified device class. The at least one memory may further store software instructions executable by the at least one processor, wherein the software instructions, when executed by the at least one processor, cause the base station to: receive from the UE a connection initiation request including an indication of a device class of the UE; determine whether the device class of the UE is the same as the device class identified by the device class profile; in response to determining that the device class of the UE is the same as the device class identified by the device class profile, establish a cellular connection with the UE using the one or more cellular connection settings of the device class profile; and in response to determining that the device class of the UE is not the same as the device class identified by the device class profile, establish a cellular connection with the UE without regard to the one or more cellular connection settings of the device class profile.

In some embodiments, the software instructions may further cause the base station to receive the device class profile from a core network of the cellular communication network prior to receiving the connection initiation request.

In some embodiments, the UE may be a link budget limited device, and the device class profile may be negotiated with the cellular communication network, prior to receiving the connection initiation request, by a companion device associated with the UE.

In some embodiments, the one or more cellular connection settings may be configured to improve efficiency of establishing the cellular connection between the base station and the UE.

In some embodiments, the at least one memory may further store a second device class profile including an identifier of a second device class, different from the first device class. The second device class profile may further include one or more cellular connection settings to be used in configuring a cellular connection between the base station and a device of the identified second device class.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
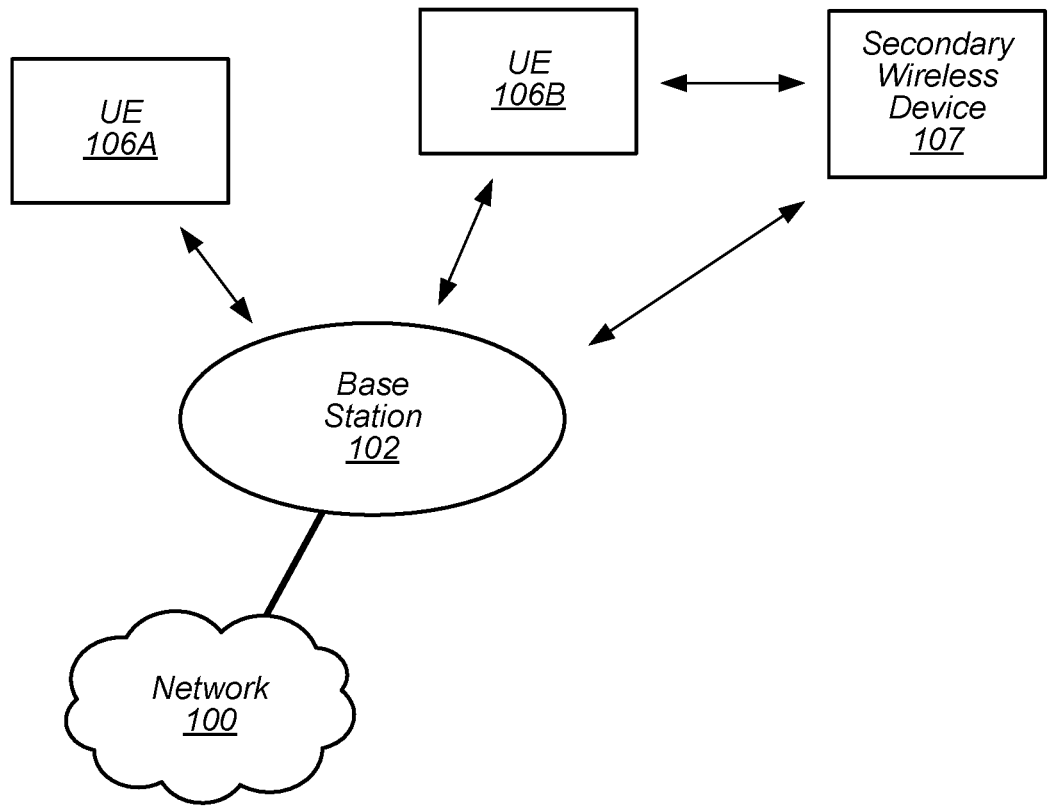
FIG. 1 illustrates an example wireless communication system including a secondary wireless device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION

Incorporation by Reference

The following documents contain subject matter relevant to the present disclosure, and are hereby incorporated by reference as if fully and completely disclosed herein. 3GPP TS 23.203 V.13.7.0; 3GPP TS 36.211 V.13.1.0.

Acronyms

The following acronyms are used in this disclosure.
3GPP: Third Generation Partnership Project
3GPP2: Third Generation Partnership Project 2
eSIM: Embedded SIM
GSM: Global System for Mobile Communications
HSS: Home Subscriber Server
ICCID: Integrated Circuit Card Identifier
IMSI: International Mobile Subscriber Identity
LTE: Long Term Evolution
LTE-A: LTE-Advanced
MME: Mobility Management Entity
SIM: Subscriber Identity Module
UMTS: Universal Mobile Telecommunications System

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless cellular communication system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Figure 2:
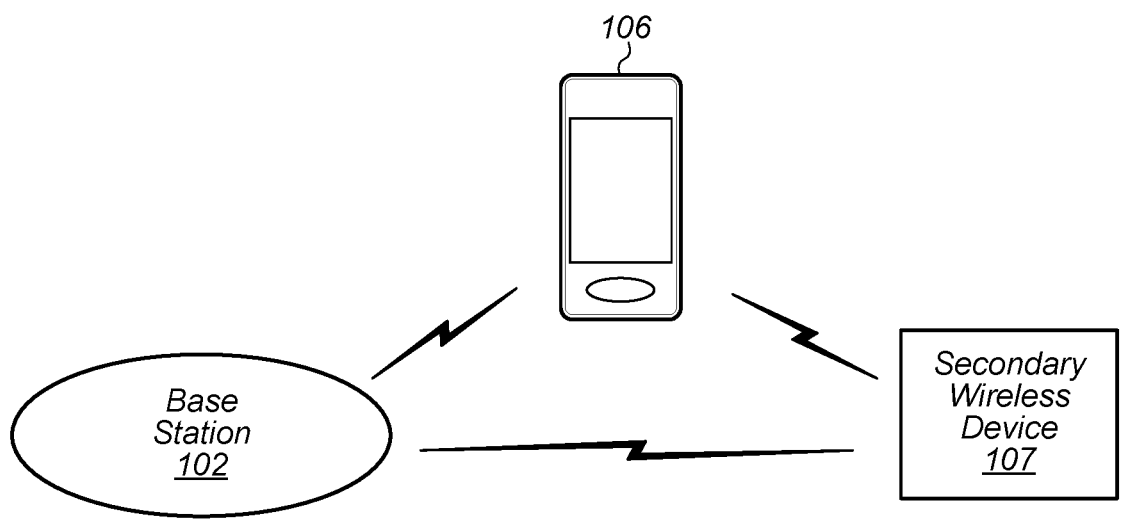
FIG. 2 illustrates an example system where a secondary wireless device can selectively either directly communicate with a cellular base station or utilize the cellular capabilities of an intermediate or proxy device, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired.

As shown, the exemplary wireless communication system includes a cellular base station 102A, which communicates over a transmission medium with one or more wireless devices 106A, 106B, etc., as well as secondary wireless device 107 (also referred to as an accessory device). Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-B and 107 and similar devices over a wide geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. The UE 106B may be configured to communicate with the UE device 107, which may be referred to as a secondary wireless device 107 (or accessory device). The secondary wireless device 107 may be any of various types of devices, such as a wearable device, a tablet computing device, a laptop computer, or a handheld device. The secondary wireless device 107 may, in some cases, have a smaller form factor and/or may be link budget limited; e.g., the secondary wireless device may have limited battery, output power, and/or communications abilities relative to UEs 106. As one common example, the UE 106B may be a smart phone carried by a user, and the secondary wireless device 107 may be a smart watch worn and/or owned by that same user. The UE 106B and the secondary wireless device 107 may communicate, e.g., using any of various short range communication protocols, such as Bluetooth.

The secondary wireless device 107 includes cellular communication capability and hence is able to directly communicate with cellular base station 102. However, since the secondary wireless device 107 is possibly one or more of communication, output power and/or battery limited, the secondary wireless device 107 may in some instances selectively utilize the UE 106B as a proxy for communication purposes with the base station 102 and hence to the network 100. In other words, the secondary wireless device 107 may selectively use the cellular communication capabilities of the UE 106B to conduct its cellular communications. The limitation on communication abilities of the secondary wireless device 107 can be permanent, e.g., due to limitations in output power or the radio access technologies (RATs) supported, or temporary, e.g., dues to conditions such as current battery status, inability to access a network, or poor reception.

In some embodiments the UE 106B and/or the secondary wireless device 107 may be configured to implement features for negotiating and/or utilizing special radio provisions for link budget limited user equipment, as described herein.

FIG. 2 illustrates an example secondary wireless device 107 in communication with base station 102. The secondary wireless device 107 may be a wearable device such as a smart watch. The secondary wireless device 107 may include cellular communication capability and be capable of directly communicating with the base station 102 as shown. The secondary wireless device 107 may also be capable of communicating with another device (e.g., UE 106), e.g., using a short range communications protocol, such as Wi-Fi or Bluetooth.

The secondary wireless device 107 may also be capable of communicating with another device (e.g., UE 106), referred to as a proxy device or intermediate device, using a short range communications protocol, and may then use the cellular functionality of this proxy device for communicating cellular voice/data with the base station 102. In other words, the secondary wireless device 107 may provide voice/data packets intended for the base station 102 over the short range link to the UE 106, and the UE 106 may use its cellular functionality to transmit (or relay) this voice/data to the base station on behalf of the secondary wireless device 107. Similarly, the voice/data packets transmitted by the base station and intended for the secondary wireless device 107 may be received by the cellular functionality of the UE 106 and then may be relayed over the short range link to the secondary wireless device. As noted above, the UE 106 may be a mobile phone, a tablet, or any other type of hand-held device, a media player, a computer, a laptop or virtually any type of wireless device.

The secondary wireless device 107 may include a processor that is configured to execute program instructions stored in memory. The secondary wireless device 107 may perform any of the method embodiments described herein by executing such stored instructions. Alternatively, or in addition, the secondary wireless device 107 may include a programmable hardware element such as an FPGA (field-programmable gate array), or other circuitry, that is configured to perform any of the method embodiments described herein, or any portion of any of the method embodiments described herein. For example, the secondary wireless device 107 may be configured to perform dynamic multi-SIM provisioning, as described herein.

The secondary wireless device 107 may include one or more antennas for communicating using two or more wireless communication protocols or radio access technologies. In some embodiments, the secondary wireless device 107 might be configured to communicate using a single shared radio. The shared radio may couple to a single antenna, or may couple to multiple antennas (e.g., for MIMO) for performing wireless communications. Alternatively, the secondary wireless device 107 may include two or more radios. For example, the secondary wireless device 107 might include a shared radio for communicating using either of LTE (or LTE-Advanced) or Bluetooth, and separate radios for communicating using each of LTE-Advanced and Bluetooth. Other configurations are also possible.

The secondary wireless device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the secondary wireless device 107 may be a smart watch or other type of wearable device. As another example, the secondary wireless device 107 may be a tablet device, such as an iPad.

Figure 3:
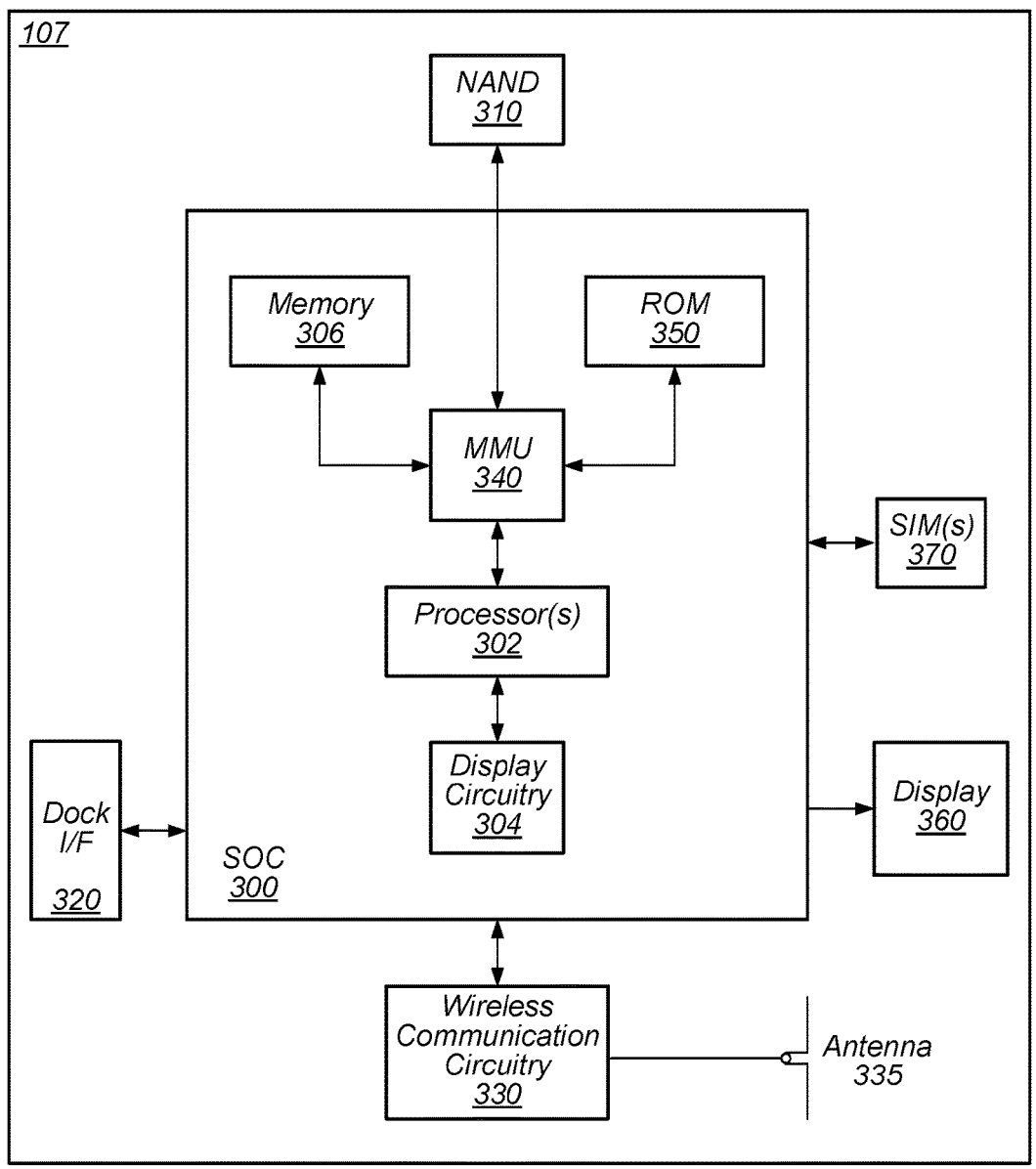
FIG. 3 is a block diagram illustrating an example secondary wireless device, according to some embodiments.

FIG. 3—Example Block Diagram of a Secondary Wireless Device

FIG. 3 illustrates one possible block diagram of a secondary wireless device 107. As shown, the secondary wireless device 107 may include a system on chip (SOC) 300, which may include portions for various purposes. For example, as shown, the SOC 300 may include processor(s) 302 which may execute program instructions for the secondary wireless device 107, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310). The MMU 340 may be configured to perform memory protection and page table translation or set up. In some embodiments, the MMU 340 may be included as a portion of the processor(s) 302.

The secondary wireless device 107 may also include other circuits or devices, such as the display circuitry 304, radio 330, connector I/F 320, and/or display 340. The wireless device 107 may further include one or more smart cards 370 that include SIM (Subscriber Identity Module) functionality, such as one or more UICC(s) (Universal Integrated Circuit Card(s)).

In the embodiment shown, ROM 350 may include a bootloader, which may be executed by the processor(s) 302 during boot up or initialization. As also shown, the SOC 300 may be coupled to various other circuits of the secondary wireless device 107. For example, the secondary wireless device 107 may include various types of memory, a connector interface 320 (e.g., for coupling to a computer system), the display 360, and wireless communication circuitry (e.g., for communication using LTE, CDMA2000, Bluetooth, Wi-Fi, NFC, GPS, etc.).

The secondary wireless device 107 may include at least one antenna, and in some embodiments multiple antennas, for performing wireless communication with base stations and/or other devices. For example, the secondary wireless device 107 may use antenna 335 to perform the wireless communication. As noted above, the UE may in some embodiments be configured to communicate wirelessly using a plurality of wireless communication standards or radio access technologies (RATs).

As noted above, the secondary wireless device 107 may include at least one smart card 370, such as a UICC, which executes one or more Subscriber Identity Module (SIM) applications and/or otherwise implements SIM functionality. The at least one smart card 370 may be only a single smart card 370, or the secondary wireless device 107 may include two or more smart cards 370.

Each smart card 370 may be embedded, e.g., may be soldered onto a circuit board in the secondary wireless device 107, or each smart card 370 may be implemented as a removable smart card. Thus the smart card(s) 370 may be one or more removable smart cards (such as UICCs, which are sometimes referred to as "SIM cards"), and/or the smart card(s) 370 may be one or more embedded cards (such as embedded UICCs (eUICCs), which are sometimes referred to as "eSIM cards"), which may be fixed/non-removable. In some embodiments, the secondary wireless device 107 may include a combination of removable smart cards and embedded smart cards, as desired. For example, the UE 106 may include two embedded smart cards 370, two removable smart cards 370, or a combination of one embedded smart card 370 and one removable smart card 370. Various other SIM configurations are also contemplated.

In some embodiments, one or more of the smart card(s) 370 may implement embedded SIM (eSIM) functionality. In such embodiments, a single one of the smart card(s) 370 may execute multiple SIMs. An eSIM may be implemented on either an eUICC or a removable UICC, as long as the card's operating system supports eSIM functionality.

Each of the smart card(s) 370 may include components such as a processor and a memory. Instructions for performing SIM/eSIM functionality may be stored in the memory and executed by the processor.

As described herein, the secondary wireless device 107 may include hardware and software components for implementing methods according to embodiments of this disclosure. For example, the secondary wireless device 107 may include hardware and software components for implementing features for negotiating and/or utilizing special radio provisions for link budget limited user equipment, such as those described herein with reference to, inter alia, FIGS. 5-6. The processor 302 of the secondary wireless device 107 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

It is noted that the UEs 106A and 106B shown in FIG. 1 may have a similar architecture to that described above.

Figure 4:
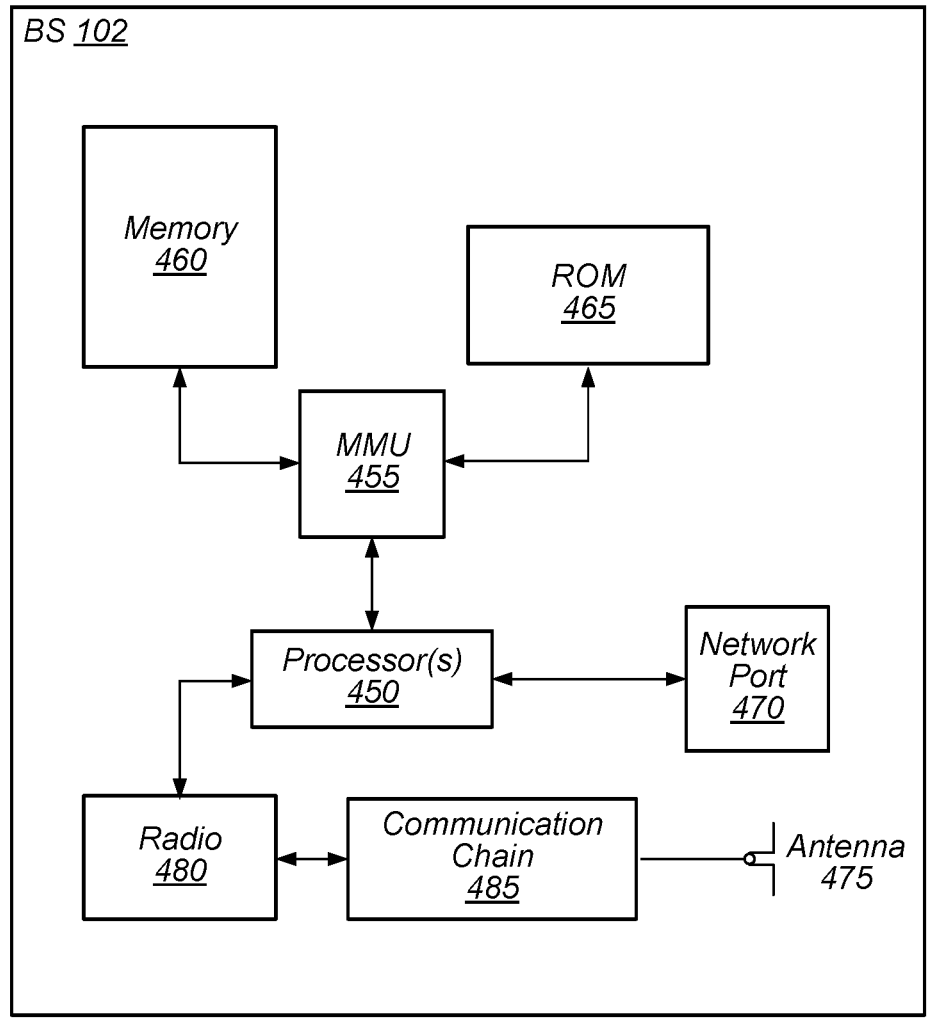
FIG. 4 is a block diagram illustrating an example base station, according to some embodiments.

FIG. 4—Example Block Diagram of a Base Station

FIG. 4 illustrates an exemplary block diagram of a base station 102. It is noted that the base station of FIG. 4 is merely one example of a possible base station. As shown, the base station 102 may include processor(s) 450 which may execute program instructions for the base station 102. The processor(s) 450 may also be coupled to memory management unit (MMU) 455, which may be configured to receive addresses from the processor(s) 450 and translate those addresses to locations in memory (e.g., memory 460 and read only memory (ROM) 465) or to other circuits or devices.

The base station 102 may include at least one network port 470. The network port 470 may be configured to couple to a telephone network and provide a plurality of devices, such as UE devices 106 and the secondary wireless device 107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106 and the secondary wireless device 107. In some cases, the network port 470 may couple to a telephone network via the core network, and/or the core network may provide a telephone network (e.g., among other UE devices serviced by the cellular service provider).

The base station 102 may include at least one antenna 475, and possibly multiple antennas. The at least one antenna 475 may be configured to operate as a wireless transceiver and may be further configured to communicate with UE devices 106 and/or the secondary wireless device 107 via radio 480. The antenna 475 communicates with the radio 480 via communication chain 485. Communication chain 485 may be a receive chain, a transmit chain or both. The radio 480 may be configured to communicate via various wireless telecommunication standards, including, but not limited to, LTE, LTE-A, UMTS, CDMA2000, etc.

Figure 5:
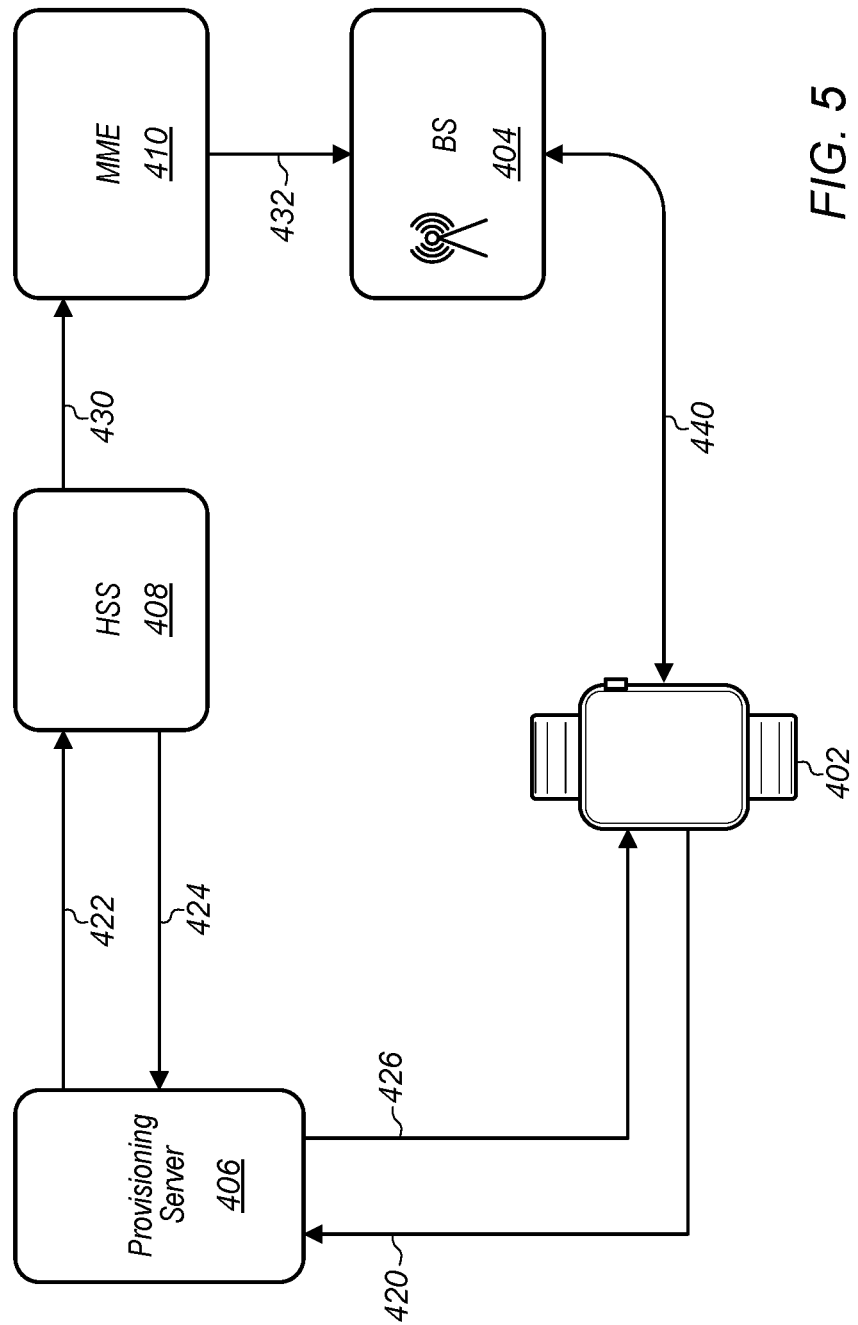
FIG. 5 is a flow diagram illustrating an example operation of a link budget limited device negotiating special radio provisions for the link budget limited device, according to some embodiments.
Figure 6:
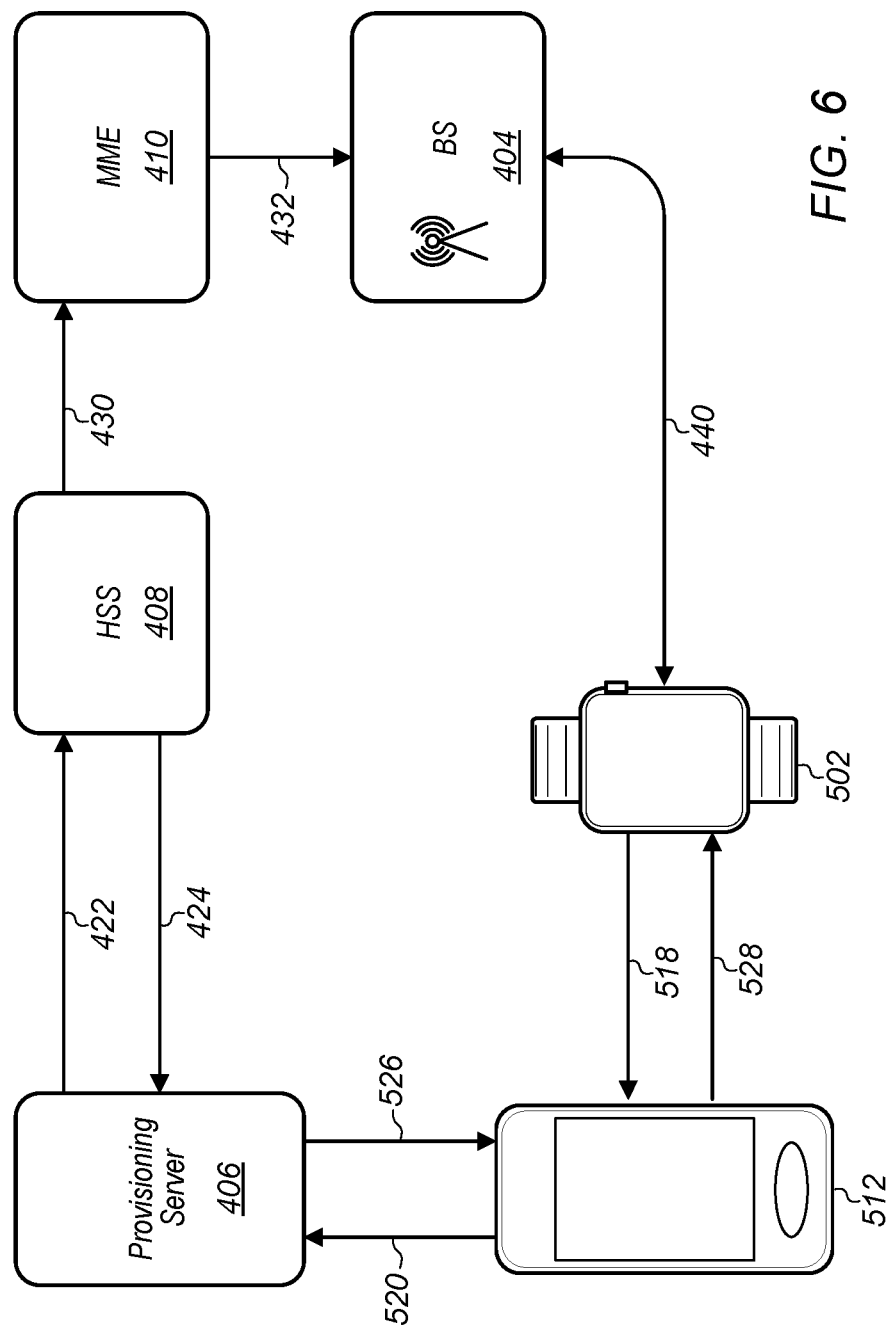
FIG. 6 is a flow diagram illustrating an example operation of a companion device negotiating special radio provisions for the link budget limited device, according to some embodiments.

An additional network device within the cellular network, e.g., the MME, HSS, and/or provisioning server of FIGS. 5-6, may, in some scenarios, have a structure similar to that of the base station 102, as shown in FIG. 4, except that the additional network device may, in some scenarios, lack components for radio communications (e.g., the antenna 475, the radio 480, and/or the communication chain 485). For example, the additional network device may include processor(s) 450, memory management unit (MMU) 455, memory 460, read only memory (ROM) 465, and/or network port 470, as illustrated in FIG. 4 and described above.

As described further subsequently herein, the BS 102, as well as various of the network devices in FIGS. 5-6, may include hardware and software components for implementing features for negotiating and/or providing special radio provisions to link budget limited user equipment, such as those described herein with reference to, inter alia, FIGS. 5-6. The processor 450 of the base station 102 may be configured to implement part or all of the methods described herein, e.g., by executing program instructions stored on a memory medium (e.g., a non-transitory computer-readable memory medium). Alternatively, the processor 450 may be configured as a programmable hardware element, such as an FPGA (Field Programmable Gate Array), or as an ASIC (Application Specific Integrated Circuit), or a combination thereof. Alternatively (or in addition), the processor 450 of the BS 102, in conjunction with one or more of the other components 455, 460, 465, 470, 475, 480, 485 may be configured to implement part or all of the features described herein, such as the features described herein with reference to, inter alia, FIGS. 5-6.

Optimization of Cellular Connection Establishment

A cellular communication device (e.g., a UE), such as the UE 106 or the secondary wireless device 107, may attach to a cellular communication network via a base station, such as the base station 102. For example, the UE may attach to an LTE network according to the random access procedure (RAP) defined for that standard. This may occur, for example, when the UE is activated. During the attach procedure, the UE may exchange messages with the cellular communication network (e.g., with a base station of the cellular communication network, such as an eNodeB). For example, the attach procedure may typically be initiated by the UE transmitting a connection initiation request to the cellular communication network. For example, the UE may initiate attachment to an LTE network by transmitting an initial attach request, sometimes referred to as message 1 (MSG1). Other cellular communication networks may use connection initiation requests of other formats and nomenclatures.

Some link budget limited devices, such as the secondary wireless device 107, may be capable of performing applications traditionally performed only by less limited UEs. For example, a link budget limited smart watch may be capable of conducting cellular voice communications. However, low-power transmitters have traditionally been associated with low-priority and/or low-data-rate applications, such as embedded sensors. As a result, in a traditional system, a cellular communication network may recognize a link budget limited device as a low-power transmitter, and may therefore set parameters for a connection with the link budget limited device based on an assumption that the link budget limited device requires few network resources. Thus, a link budget limited device may be handicapped in performing high-priority, high-data-rate applications.

Additionally, in traditional systems, a cellular communication network may be optimized for performance of less limited UEs. As a result, a link budget limited device may encounter difficulty when connecting to the cellular communication network, even if provided with the same resources as a less limited UE. For example, the link budget limited device may have substantially less battery power than a traditional UE, or may have a low maximum transmit power, e.g., due to battery and/or antenna limitations. However, the cellular communication network may optimize connection parameters (e.g. NAT session timeout, QoS parameters) based on assumptions that a UE will have more traditional battery power and transmit power.

For these reasons, it may be advantageous to communicate to the cellular communication network minimum or optimal parameters for a connection with the link budget limited device.

To accomplish this, a UE (e.g., a link budget limited device) may identify its device class (also referred to as device type or device category) to the cellular communication network, e.g., in the connection initiation request. The cellular communication network may store device class profiles specifying connection settings and/or other parameters that are desirable (e.g., optimized) for given device classes. When the UE requests attachment to the cellular communication network and identifies its device class, the cellular communication network may establish a cellular connection with the UE using the connection settings and/or other parameters specified in the device class profile for the identified device class of the UE. Alternatively, the cellular communication network may store device profiles specifying such parameters that are desirable for specific UEs, and the cellular communication network may establish a cellular connection with the specific UE using the parameters specified in the device profile for that UE.

The following are example parameters that may be specified in a device class profile in an LTE cellular communication network. It should be understood that these are simply examples, and that other parameters and/or other cellular communication networks may be applied within the scope of this disclosure.

Device Class:

A device class parameter may identify the device class with which a device class profile is associated. For example, a device class value of "Watch" may identify a UE that is (or includes, or is included in) a smart watch; a device class value of "Glasses" may identify a UE as smart glasses; a device class value of "Phone" may identify a UE as a traditional cellular telephone or smart phone. If a UE identifies itself with a device class value matching the device class value of the device class profile, then the cellular communication network may apply the parameters stored in the device class profile to establishing a cellular connection with that UE.

NAT Timer:

A NAT Timer parameter may specify a minimum value for the cellular communication network to assign as the Network Address Translation (NAT) session timeout value for a connection using the device class profile. The NAT session timeout value assigned by the cellular communication network defines the inactivity time after which the NAT connection will be terminated. Thus, a shorter NAT session timeout value requires the UE to conduct activity on the connection more frequently to avoid termination of the NAT connection, meaning that a shorter NAT session timeout value leads to increased power consumption by the UE. Therefore, a UE may benefit from a longer NAT session timeout value.

In a traditional system, when a UE attaches to a cellular communication network, the UE may not be aware of the NAT session timeout value used by the cellular communication network. Thus, the UE may guess at the NAT session timeout value, and conduct activity on the connection frequently enough to avoid NAT session timeout based on the guessed timeout value. The UE may then incrementally adjust its guess to attempt to minimize its required activity without losing the NAT connection. This process of guessing and adjusting may cause the UE drop the NAT connection one or more times, and may also cause the UE to engage in an unnecessarily high rate of activity while searching for a correct value. Therefore, a UE, and particularly a link budget limited (e.g., power limited) device, may benefit from knowing in advance the NAT session timeout value used by the cellular communication network, or at least a minimum NAT session timeout value used by the cellular communication network.

Additionally, carriers, which traditionally assign a NAT session timeout value globally on their network firewalls, are resistant to extending timers because it limits their IP pool. However, by utilizing device class profiles or device profiles, the cellular communication network may assign a NAT session timeout value for specific devices or devices of a particular class (e.g., a link budget limited class, such as smart watches) that is equal to or greater than the minimum value specified by the NAT Timer parameter included in the associated profile, while potentially assigning a different (e.g., shorter) NAT session timeout value for other devices.

The NAT Timer parameter may thus be used to specify a value that would be desired (e.g., optimized) for the identified device class, without significantly impacting the performance of the cellular communication network.

RACH Preamble:

A RACH Preamble parameter may identify a reserved preamble for the identified device class. A preamble is included in MSG1 for RACH procedures. Available preambles are enumerated from 0 to 63. A reserved preamble for the identified device class may help the cellular communication network, and especially the eNB, to identify the UE as a link budget limited device early in the attach procedure. This early identification may then enable a special treatment, either in terms of resources, link budget or latency.

Additionally, there may be advantages to using higher numbered preambles. For example, higher numbered preambles may have a different format than lower numbered preambles, such that the higher numbered preambles may have improved detection at lower signal-to-noise ratios. In a traditional system, a cellular communication network may disallow a link budget limited device from using such higher numbered preambles, based on the assumption that a low-power UE is likely to be associated with low-priority and/or low-data-rate applications. By contrast, the cellular communication network might traditionally allow use of a larger range of preambles by UEs that are expected to conduct higher-priority applications, such as voice communications. Thus, where a device class represents a category of link budget limited devices that are expected to perform higher-priority applications (e.g., a cellular-voice-capable smart watch), it may be advantageous for a UE of that class to be authorized to use a higher-numbered reserved preamble, specified by the RACH preamble parameter.

RACH Preambles, as used in traditional systems, are disclosed more fully in 3GPP TS 36.211 V.13.1.0, which was previously incorporated by reference.

QoS:

A QoS parameter (which may in some scenarios include an array or other collection of parameters) may identify requested Quality of Service (QoS) metrics for the identified device class. For example, the QoS parameter may include a QoS Class Identifier (QCI) parameter identifying a traffic class that may be used by the identified device class. QCI values, as used in traditional systems, are disclosed more fully in 3GPP TS 23.203 V.13.7.0, which was previously incorporated by reference. The QoS parameter may further include additional parameters to be associated with the traffic class specified by the QCI parameter for the identified device class. For example, the QoS parameter may further include a minimum bitrate, delay value, and/or jitter value.

As an example, the QoS parameter may include a QCI parameter specifying QCI1 if the identified device class is expected to perform conversational voice communications. The QoS parameter may further include additional parameters (e.g., minimum bitrate, delay value, and/or jitter value) requested for conversational voice communications transmitted between the cellular communication network and a UE of the identified device class. For example, the additional parameters may represent values that are optimized for conversational voice communications, or that represent minimum requirements for conversational voice communications. When the cellular communication network exchanges conversational voice data with the UE, the cellular communication network may configure the connection according to QCI1 and the additional parameters. For example, the cellular communication network may configure the connection with a priority of 2, a packet delay budget of 100 ms, and a packet error loss rate of $10^{-2}$, as specified by QCI1, and the cellular communication network may further configure the connection with the minimum bitrate, delay value, jitter value, etc., specified by the additional parameters of the device class profile.

In some scenarios, the QoS parameter may further include one or more additional QCI parameters, which may have respective additional parameters. For example, the QoS parameter in the example above may further include a second QCI parameter of QCI9 if the identified device class is expected to perform TCP-based data communications, along with second additional parameters (e.g., a second minimum bitrate, delay value, and/or jitter value) requested for TCP-based data communications transmitted between the cellular communication network and a UE of the identified device class. When the cellular communication network exchanges TCP-based data with the UE, the cellular communication network may configure the connection according to QCI9 and the second additional parameters. For example, the cellular communication network may configure the connection with a priority of 9, a packet delay budget of 300 ms, and a packet error loss rate of $10^{-6}$, as specified by QCI9, and the cellular communication network may further configure the connection with the specified second minimum bitrate, delay value, jitter value, etc.

In some scenarios, the QoS parameter may include additional QCI parameters and associated additional parameters for any traffic class defined in the LTE standards (or other standards defining an applicable cellular communication network). Thus, the device class profile may define QoS parameters for each traffic class that devices of the identified device class are expected to use, or for any subset thereof.

In some scenarios, the cellular communication network may configure the connection between the cellular communication network and a UE in the identified device class according to the parameters specified in the device class profile for any traffic class included in the profile, and may select parameters according to traditional procedures for any traffic class not included in the profile. In other scenarios, the cellular communication network may configure the connection between the cellular communication network and the UE only according to traffic class values included in the profile.

Defining QoS parameters for one or more QCI values may improve the efficiency and performance of communications between the UE and the cellular communication network. For example, in some traditional systems it is common for the cellular communication network to apply QCI1 for voice calls (e.g., VoLTE), and QCI9 for all other data communications, without further differentiation of the application making use of the communication. This means that connections supporting high-data-rate communications such as video-conferencing may be configured with the same parameters as low-data-rate communications such as web browsing. However, if a certain class of device is expected to perform primarily a known application, then the profile for that device class may specify parameters that are desirable (e.g., optimized or minimum required) for that application.

As noted above, in some scenarios, a cellular communication network may store a device profile for a specific device (e.g., a specific link budget limited device), as opposed to, or in addition to, storing a device class profile. Whereas a device class profile may be applied to a plurality of devices of a certain class, a device profile may instead be applied to only a specific device. For example, a device profile may include parameters such as those described above, which may be applied to a connection between the cellular communication network and the specific device.

FIG. 5—Profile Generation by the Link Budget Limited Device

Profiles, such as the device class profiles or device profiles discussed above, may be stored by the cellular communication network prior to initiation of attachment by a UE to which the profile applies. Thus, the UE may attach to the cellular communication network using the parameters specified in the applicable profile, which may facilitate the attach procedure.

FIG. 5 illustrates an example block diagram of a wireless communication system in which a link budget limited device may directly negotiate a device class profile and/or device profile with the cellular communication network.

FIG. 5 shows a UE 402, a base station (BS) 404, a provisioning server 406, a home subscriber server (HSS) 408, and a mobility management entity (MME) 410. The UE 402 may be a link budget limited device, such as the secondary wireless device 107. The BS 404 may be a base station such as the base station 102. The provisioning server 406 (sometimes also referred to as an entitlement server) may include one or more server devices configured to provide integration with the core network components of the cellular wireless network. For example, the provisioning server 406 may be configured to provide information regarding whether specific services (e.g., Wi-Fi calling, personal hotspot) are available to a user device or to devices associated with a user account. The provisioning server 406 may be hosted by a carrier, such as a cellular service provider, or by an agent of the carrier, or by another entity. The HSS 408 and the MME 410 may include one or more server devices in the core network.

The UE 402 may be capable of performing cellular communication via the BS 404. However, for reasons such as those previously noted, attaching to the BS 404 according to traditional procedures may cause the UE 402 to expend undesirable levels of time and/or power.

The UE 402 may also be capable of communicating according to one or more non-cellular wireless communication protocols, such as one or more wireless local area network (WLAN) protocols (e.g., Wi-Fi protocols). In some scenarios, the UE 402 may communicate according to the one or more non-cellular wireless communication protocols with the provisioning server 406 (e.g., via one or more intermediate networks, such as a Wi-Fi network and/or the Internet). Thus, the UE 402 may negotiate a device profile or device class profile to the cellular communication network by using a non-cellular protocol prior to attaching to the BS 404. The UE 402 may negotiate the profile prior to transmitting a connection initiation request, such as a MSG1, or otherwise establishing a cellular connection with the cellular communication network.

Specifically, at communication 420, the UE 402 may communicate requested profile information to the provisioning server 406 using a non-cellular protocol, e.g. directly or through one or more intermediate networks. The requested profile information may include requested values of one or more cellular connection settings for a cellular connection between the cellular communication network and the UE 402, as discussed above. In some scenarios, the requested profile information may define a device class profile, which may be applicable to a class of devices to which the UE 402 belongs. In some scenarios, the requested profile information may alternatively, or additionally, define a device profile, which may be applicable only to the UE 402. In some scenarios, the requested profile information may include an indication of a profile type; e.g., the requested profile information may include an indication of whether the requested profile information defines a device profile or a device class profile. In some scenarios, the presence of a particular field or value within the requested profile information may indicate the profile type. For example, in some scenarios, the presence of a Device Class parameter within the requested profile information may indicate that the requested profile information defines a device class profile, while the absence of the Device Class parameter may indicate that the requested profile information defines a device profile.

An example data format for the communication 420, including requested profile information defining a device class profile is provided below in the JavaScript Object Notation (JSON) schema of Schema 1. It should be understood that the provided schema is only an example, and that other data formats and/or other data fields may be used within the scope of the present disclosure.

Schema 1

```
{
  "$schema": "http://json-schema.org/draft-04/schema#",
  "type": "object",
  "title": "getSIMStatus schema.",
  "description": "Describes the getSIMStatus Request",
  "name": "/",
  "properties": {
    "request-id": {
```

Schema 1 -continued

```
      "type": "integer",
      "title": "request-id attribute",
      "description": "Identifies the particular action. Unique within a request.",
      "name": "request-id"
    },
    "action-name": {
      "type": "string",
      "title": "action-name attribute",
      "description": "Identifies the name of the Entitlements request action",
      "name": "action-name",
      "default": "getSIMStatus",
      "enum": [getSIMStatus]
    },
    "primary-iccid": {
      "type": "string",
      "title": "primary-iccid attribute",
      "description": "Contains the iPhone's Integrated Circuit Card Identifier.",
      "name": "primary-iccid"
    },
    "secondary-device-params": {
      "type": "array",
      "title": "secondary-device-params attribute",
      "description": "List of devices paired to the Primary and its default
      parameter values",
      "name": "secondary-device-params",
      "items": {
        "type": "object",
        "title": "secondary-device-params attribute",
        "description": "Defines secondary-device-params attributes",
        "properties": {
          "device-class": {
            "type": "string",
            "title": "device-class attribute",
            "description": "Identifies the device class this settings are applicable to",
            "name": "device-class",
            "enum": ["Watch"]
          },
          "nat-timer": {
            "type": "integer",
            "title": "Nat-timer attribute",
            "description": "Network Address Translation entry time out
            expressed in seconds",
            "name": "nat-timer"
          },
          "rach-preamble": {
            "type": "integer",
            "title": "rach-preamble attribute",
            "description": "Reserved resource used for MSG1",
            "name": "rach-preamble",
            "minimum": 0,
            "maximum": 63
          },
          "qos": {
            "type": "array",
            "title": "QoS Attribute",
            "description": "Quality Of Service configuration",
            "name": "qos-class",
            properties: {
              "qci": {
                "type": "integer",
                "title": "qci attribute",
                "description": "Identifies the 3GPP QoS class identifier",
                "name": "qci",
                "enum": [1,2,3,4,5,6,7,8,9,65,66,69,70]
              },
              "min-bitrate": {
                "type": "integer",
                "title": "min-bitrate attribute",
                "description": "Traffic class minimun bitrate in Kbps",
```

-continued

Schema 1

```
            "name": "min-bitrate",
            "minimum": "1"
          },
          "delay": {
            "type": "integer",
            "title": "delay attribute",
            "description": "Time it takes a packet to reach the Rx
            endpoint. In msecs",
            "name": "delay"
          },
          "jitter": {
            "type": "integer",
            "title": "jitter attribute",
            "description": "Variation in the delay of received
            packets",
            "name": "jitter"
          }
        }
      }
    }
  },
  "required": [
    "device-class"
  ]
 }
},
"required": [
  "request-id",
  "action-name",
  "primary-iccid",
  "secondary-device-params"
]
}
```

At communication 422, the provisioning server 406 may communicate the requested profile information, or some subset thereof, to the HSS 408. The communication 422 may be in response to the provisioning server 406 receiving the communication 420. In some scenarios, the provisioning server 406 may also provide additional information pertaining to user accounts, e.g., at the communication 422. For example, the provisioning server 406 may identify additional devices associated with the same user account as the UE 402. Such additional cellular communication devices may be said to be in the same account family as the UE 402. For example, in some scenarios, if a user of the UE 402 has a customer account with the cellular service provider allowing for the service provider to provide cellular service for the UE 402, and the customer account also allows for the service provider to provide cellular service for additional cellular communication devices (e.g., smartphone, tablet computer, etc.), then the additional cellular communication devices may be said to be in the same account family as the UE 402, and the provisioning server 406 may provide identification information pertaining to the additional cellular communication devices. As another example, in some scenarios, additional cellular communication devices may be said to be in the same account family as the UE 402 if they are associated with the UE 402 based on another type of shared user account, such as a shared iCloud™ account.

In some scenarios, the provisioning server 406 may identify additional devices associated with the same user account as the UE 402 (i.e., that are in the account family of the UE 402) that are also in the same device class as the UE 402.

In response to receiving the communication 422, the HSS 408 may evaluate the requested profile information, and determine approved profile information. For example, the HSS may determine whether to accept the requested values of the one or more cellular connection settings as approved values of the one or more cellular connection settings. The HSS 408 may make this determination based on one or more factors, such as network capabilities, available resources, power characteristics and/or link budget requirements of the UE 402, etc. Specifically, the approved profile information may include an approved value for each of the one or more cellular connection settings for which a requested value was included in the requested profile information, or for some subset thereof. In some scenarios, the approved value for a given cellular connection setting may be the same as the requested value for the same cellular connection setting. In some scenarios, the approved value for a given cellular connection setting may be different than the requested value for the same cellular connection setting. In this manner, the HSS 408 may indicate whether the cellular communication network will establish a cellular connection according to the requested value for the cellular connection setting, or instead use an alternative value.

The approved profile information may, in some scenarios, further include an approved value for one or more additional cellular connection settings, for which no requested value was included in the requested profile information. As one example, the approved profile information may include an approved value for a set of PRACH Configuration parameters, which may identify the subframes that will be used for RACH and/or other PRACH configuration values, such as a number of repetitions if needed, a root sequence used, power ramp up, etc.

The HSS 408 may save the approved profile information as either a device profile or a device class profile, e.g., depending upon the information included in the requested profile information. For example, the approved profile information may be saved as a device profile associated with the UE 402. Specifically, the device profile may be associated with the UE 402 by including a device identifier of the UE 402 (e.g., IMSI, IMEI, or Device ID), which may be provided in the communication 422 and, in some scenarios, in the communication 420. Similarly, the approved profile information may be saved as a device class profile associated with a device class identified in the requested profile information, e.g., by including the Device Class parameter in the profile. In some scenarios, the saved profile may further include account family information, e.g., provided by the provisioning server 406. For example, the saved profile may include identification information and/or device class information regarding other devices in the account family. In such scenarios, the saved profile may be associated with all of the devices included in the account family. Alternatively, the saved profile may be associated with all devices in the account family that have the device class matching a device class identified in the requested profile information.

After determining the approved profile information (e.g., in response to determining the approved profile information), the HSS 408 may, at communication 424, communicate the approved profile information to the provisioning server 406. The HSS 408 may also, at communication 430, communicate the approved profile information to the MME 410. The MME 410 may, at communication 432, pass the approved profile information to the BS 404 for use in establishing a cellular connection with the UE 402. For example, in some embodiments, the MME 410 may pass the approved profile information to each BS associated with the MME.

In response to the provisioning server 406 receiving the communication 424, the provisioning server 406 may, at communication 426, communicate the approved profile information, or some subset thereof, to the UE 402. The communication 426 may be according to a non-cellular protocol (e.g., the same protocol used for the communication 420).

An example data format for the communication 426, including approved profile information defining a device class profile is provided below in the JSON schema of Schema 2. It should be understood that the provided schema is only an example, and that other data formats and/or other data fields may be used within the scope of the present disclosure.

Schema 2

```
{
  "$schema": "http://json-schema.org/draft-04/schema#",
  "type": "object",
  "title": "getSIMStatus schema.",
  "description": "Describes the getSIMStatus Response",
  "name": "/",
  "properties": {
    "response-id": {
      "type": "integer",
      "title": "response-id attribute",
      "description": "Must match the request-id for which this response applies.",
      "name": "response-id"
    },
    "status": {
      "type": "integer",
      "title": "status attribute",
      "description": "Status response code for the action. Determines if successful or not",
      "name": "status"
    },
    "secondary-device-params": {
      "type": "array",
      "title": "secondary-device-params attribute",
      "description": "List of devices paired to the Primary and its default parameter values",
      "name": "secondary-device-params",
      "items": {
        "type": "object",
        "title": "secondary-device-params attribute",
        "description": "Defines secondary-device-params attributes",
        "properties": {
          "device-class": {
            "type": "string",
            "title": "device-class attribute",
            "description": "Identifies the device class this settings are applicable to",
            "name": "device-class",
            "enum": ["Watch"]
          },
          "nat-timer": {
            "type": "integer",
            "title": "Nat-timer attribute",
            "description": "Network Address Translation time out expressed in seconds",
            "name": "nat-timer"
          },
          "rach-preamble": {
            "type": "integer",
            "title": "rach-preamble attribute",
            "description": "Reserved resource used for MSG1",
            "name": "rach-preamble",
            "minimum": 0,
            "maximum": 63
          },
          "prach-config-sib": {
            "type": "string",
            "title": "prach-config-sib attribute",
            "description": "RACH config from SIB 2, Base-64 encoded",
            "name": "prach-config-sib"
          },
          "qos": {
            "type": "array",
```

Schema 2

```
            "title": "QoS Attribute",
            "description": "Quality Of Service configuration",
            "name": "qos-class",
            properties: {
              "qci": {
                "type": "integer",
                "title": "qci attribute",
                "description": "Identifies the 3GPP QoS class identifier",
                "name": "qci",
                "enum": [1,2,3,4,5,6,7,8,9,65,66,69,70]
              },
              "min-bitrate": {
                "type": "integer",
                "title": "min-bitrate attribute",
                "description": "QCI minimun bitrate in Kbps",
                "name": "min-bitrate",
                "minimum": 1
              },
              "delay": {
                "type": "integer",
                "title": "delay attribute",
                "description": "Time it takes a packet to reach the receiving endpoint. In msecs",
                "name": "delay"
              },
              "jitter": {
                "type": "integer",
                "title": "jitter attribute",
                "description": "Variation in the delay of received packets",
                "name": "jitter"
              }
            }
          }
        },
        "required": [
          "device-class"
        ]
      }
    }
  },
  "required": [
    "response-id",
    "status",
    "secondary-device-params"
  ]
}
```

Once the UE 402 has received the approved profile information in the communication 426, the UE 402 may initiate an attach procedure to establish a cellular connection with the cellular wireless network. For example, the UE 402 may initiate the attach procedure by transmitting a connection initiation request 440 (e.g., a MSG1) to the BS 404.

The UE 402 may include in the connection initiation request 440, an identifier associating the UE 402 with the saved profile. For example, if the saved profile is a device profile associated with the UE 402, then the UE 402 may include in the connection initiation request 440 a device identifier (e.g., IMSI, IMEI, or Device ID) of the UE 402, matching the device identifier included in the saved profile. Such a device identifier may already be included in a connection initiation request, according to traditional systems. As another example, if the saved profile is a device class profile, then the UE 402 may include in the connection initiation request 440 a class identifier of the UE 402 matching the device class parameter included in the saved profile.

The UE 402 may further configure the connection initiation request 440 according to the saved profile; e.g., according to the approved values of the cellular connection settings included in the approved profile information. For example, if the saved profile includes a RACH Preamble parameter with a value of 63, then the UE 402 may include RACH Preamble 63 in the connection initiation request 440.

In some scenarios, the BS 404 may have received and stored the saved profile prior to receiving the connection initiation request 440. For example, the BS 404 may have received the saved profile via the communications 430 and 432 at approximately the same time the UE 402 received the approved profile information. In some scenarios, the BS 404 may not automatically receive the saved profile. Instead, the BS 404 may request that the saved profile be provided to the BS 404 by the MME and/or the HSS, e.g., via the communications 430 and 432, in response to the BS 404 receiving the connection initiation request 440.

In response to receiving the connection initiation request 440 and the saved profile, the BS 404 may determine whether connection initiation request 440 indicates that the UE 402 is associated with the saved profile. For example, the BS 404 may determine that the device identifier and/or device class identifier included in the connection initiation request 440 matches the device identifier and/or device class parameter included in the saved profile. If the BS 404 determines that a received connection initiation request does not include a device identifier or device class identifier matching any available saved profiles, then the BS may respond to the received connection initiation request without regard to the saved profiles; e.g., according to traditional procedures. However, if the BS 404 determines that a received connection initiation request does include a device identifier and/or device class identifier matching a saved profile, then the BS may respond to the received connection initiation request using that saved profile.

Thus, in the example of FIG. 5, the BS 404 may, in response to determining that the initiation request 440 indicates that the UE 402 is associated with the saved profile, establish a cellular connection with the UE 402 according to the saved profile; e.g., using the approved values of the cellular connection settings included in the approved profile information and included in the saved profile. For example, the BS 404 may establish the cellular connection using a NAT session timeout value equal to or greater than the minimum value specified by a NAT Timer parameter included in the saved profile. Similarly, the BS 404 may establish the cellular connection using QoS values specified in the saved profile. For example, the BS 404 may assign a QCI specified in the saved profile, and may allocate other parameters (e.g., minimum bitrate, delay value, and/or jitter value) associated with the specified QCI in the saved profile.

As noted above, in some scenarios, the BS 404 may use a device class profile in establishing a cellular connection with any device identifying itself as belonging to the applicable device class (e.g., by including an indication of the applicable device class in a connection initiation request). Thus, multiple devices of the applicable device class may benefit from the UE 402 negotiating a device class profile with the cellular communication network. For example, if the UE 402 negotiates a device class profile for the device class "Watch" (e.g., by including a Device Class parameter with the value "Watch" in the requested profile information of the communication 420, and receiving a Device Class parameter with the value "Watch" in the approved profile information of the communication 426), then the BS 404 may apply the approved values of the cellular connection settings included in the saved profile when establishing a cellular connection in response to any connection initiation request that includes a Device Class parameter of "Watch".

As noted above, in some scenarios, the saved profile may apply only to devices belonging to the account family of the UE 402. For example, the saved profile may include device identifiers for all devices in the family of the UE 402, or for all devices in the family having a device type specified in the requested profile information. As another example, information regarding associations between devices in an account family may be stored separately from the saved profile, and the BS 404 (or other network element) may determine an account family relationship between the UE 402 and a second device that transmits a connection initiation request in response to the BS 404 receiving the session initiation request from the second device. Thus, in some scenarios, multiple devices in an account family (e.g., devices in the account family having the same device class as the UE 402) may benefit from the UE 402 negotiating a device profile or device class profile with the cellular communications network. For example, if the UE 402 negotiates a device class profile for the device class "Watch," then the BS 404 may the approved values of the cellular connection settings included in the saved profile when establishing a cellular connection in response to any connection initiation request that that includes a Device Class parameter of "Watch" and that includes a device identifier of a device in the account family of the UE 402. For example, if a user of the UE 402 has a second cellular-capable watch associated with the same cellular service plan, that second watch may benefit from the profile negotiated by the UE 402.

In some scenarios, the UE 402 may communicate the approved profile information to one or more other devices (not shown) belonging to the same device class and/or account family to which the saved profile may apply. Thus, the one or more other devices may also apply the approved values of the cellular connection settings when establishing a cellular connection with the cellular communication network (e.g., when transmitting a connection initiation request).

FIG. 6—Profile Generation a Companion Device

A link budget limited device may, in some scenarios, utilize the cellular capabilities of an intermediate or proxy device. For example, a smart watch may utilize the cellular capabilities of a companion device, such as a smart phone. FIG. 6 illustrates an example block diagram of a wireless communication system in which a link budget limited device may negotiate a device class profile and/or device profile via such a companion device. This may be beneficial, e.g., where the link budget limited device is not able to communicate with the provisioning server 406 via a non-cellular connection, or where further power savings may be realized by the link-budget limited device by delegating the negotiation to the companion device.

FIG. 6 shows a UE 502, a companion device 512, a base station (BS) 404, a provisioning server 406, a home subscriber server (HSS) 408, and a mobility management entity (MME) 410. The UE 502 may be a link budget limited device, such as the secondary wireless device 107. The companion device 512 may be an intermediate or proxy wireless communications device, such as the UE 106B. The base station (BS) 404, the provisioning server 406, the home subscriber server (HSS) 408, and the mobility management entity (MME) 410 may be as described in connection with FIG. 5.

The UE 502 may be capable of performing cellular communication via the BS 404. However, for reasons such as those previously noted, attaching to the BS 404 according to traditional procedures may cause the UE 502 to expend undesirable levels of time and/or power.

The UE 502 may also be capable of communicating according to one or more non-cellular wireless communication protocols, such as one or more short- or medium-range wireless communication protocols, such as Wi-Fi and/or Bluetooth. In some scenarios, the UE 502 may communicate according to the one or more non-cellular wireless communication protocols with the companion device 512. For example, the UE 502 may communicate directly with the companion device 512 using a peer-to-peer non-cellular wireless communication protocol. As another example, the UE 502 may communicate with the companion device 512 using a shared local wireless network (e.g., a shared Wi-Fi network). As yet another example, the UE 502 may communicate with the companion device 512 via the Internet. If the UE 502 communicates with the companion device 512 via the internet, security of the communications may be maintained by passing the communications through a shared authenticated account, such as a shared iCloud™ account. For example, the UE 502 may pass communications to the shared authenticated account, which may capable of forwarding the communications to the companion device 512, because the companion device 512 is authorized to access the same account. The companion device 512 may respond to the UE 502 in the same manner. In this way, the companion device 512 may securely function as a proxy or companion device to the UE 502, even while the two devices are not in close proximity.

Like the UE 402 of FIG. 5, the UE 502 may seek to negotiate a device profile or device class profile with the cellular communication network prior to transmitting a connection initiation request, such as a MSG1, or otherwise establishing a cellular connection with the cellular communication network. To this end, the UE 502 may utilize the companion device 512 as a proxy to negotiate a profile with the cellular communication network.

Specifically, at communication 518, the UE 502 may communicate requested profile information to the companion device 512 using a non-cellular protocol, e.g., directly or through one or more intermediate networks. The requested profile information may be as described with regard to FIG. 5, and may define a device profile and/or a device class profile.

In response to receiving the communication 518, the companion device 512 may, at communication 520, communicate the requested profile information to the provisioning server 406. The companion device 512 may communicate with the provisioning server 406 using a non-cellular protocol, either directly or through one or more intermediate networks. Alternatively, or additionally, the companion device 512 may communicate with the provisioning server 406 using a previously-established cellular connection with the cellular communication network. For example, the companion device 512 may communicate with the provisioning server 406 via the BS 404. The communication 520 may, as one example, be formatted according to Schema 1, shown above.

At communication 422, the provisioning server 406 may communicate the requested profile information, or some subset thereof, and in some scenarios account family information as well, to the HSS 408, as described with regard to FIG. 5. In response, the HSS 408 may determine and save approved profile information, and may communicate it to the provisioning server 406 at communication 424 and to the MME 410 at 430, as described with regard to FIG. 5. The MME 410 may, at communication 432, pass the approved profile information to the BS 404 for use in establishing a cellular connection with the UE 502.

In response to the provisioning server 406 receiving the communication 424, the provisioning server 406 may, at communication 526, communicate the approved profile information, or some subset thereof, to the companion device 512. The communication 526 may be according to a cellular or non-cellular protocol (e.g., the same protocol used for the communication 520). The communication 526 may, as one example, be formatted according to Schema 2, shown above.

In response to the companion device 512 receiving the communication 526, the companion device 512 may, at communication 528, communicate the approved profile information, or some subset thereof, to the UE 502.

Once the UE 502 has received the approved profile information in the communication 426, the UE 402 may initiate an attach procedure to establish a cellular connection with the cellular wireless network, e.g., by transmitting a connection initiation request 440 (e.g., a MSG1) to the BS 404. The connection initiation request 440 may be as described with regard to FIG. 5. Establishment of the cellular connection with the cellular wireless network, including application of the saved profile, may also proceed as described with regard to FIG. 5.

Use of the companion device 512 as a proxy in negotiating the profile may offer several advantages, as compared to the UE 402 communicating directly with the provisioning server 406. For example, as noted above, in some scenarios, the UE 502 may be unable to communicate with the provisioning server 406 via a non-cellular protocol. For example, the provisioning server may not support communications via non-cellular protocols. Further, in some scenarios, additional power savings may be realized by the UE 502 by delegating the negotiation to the companion device 512.

In some scenarios, use of the companion device 512 as a proxy in negotiating the profile may obviate one or more future communications by the UE 502. For example, in response to receiving the communication 518, the companion device may store the requested profile information. Subsequently (e.g., when the companion device 512 establishes communication with a different cellular communication network), the companion device may again negotiate a profile for the UE 502. In such a subsequent negotiation, at least the communication 518 may be omitted because the companion device has already received the requested profile information.

Similarly, use of the companion device 512 as a proxy in negotiating the profile may obviate communications by other devices associated with the companion device 512. For example, in response to receiving the communication 526, the companion device 512 may communicate the approved profile information not only to the UE 502, but also to any other associated devices to which the profile may apply (not shown). As a specific example, if the saved profile is a device class profile for a "Watch" device class, then the companion device may communicate the approved profile information to a second device (not shown) that is associated with the companion device 512 (e.g., that is in communication with the companion device 512, or is in the same account family), and that belongs to the "Watch" device class. Thus, the second device need not negotiate a profile, but may instead initiate a connection with the BS 404 using the approved profile information. As another specific example, if the saved profile applies to the account family of the UE 502, then the companion device may communicate the approved profile information to one or more additional devices (not shown) belonging to that account family. Thus, the one or more additional devices need not negotiate a profile, but may instead initiate a connection with the BS 404 using the approved profile information.

In some scenarios, the companion device 512 may be able to negotiate multiple profiles in a single negotiation exchange. For example, the companion device 512 may receive a second set of requested profile information from a second link budget limited device (not shown). In such an example, the companion device may communicate to the provisioning server 406 a single communication 520 including multiple sets of requested profile information corresponding to multiple device classes or multiple devices.

Example Embodiments

Further details regarding certain example embodiments may be as follows.

An apparatus for negotiating one or more cellular connection parameters for a cellular connection between a cellular communication network and a mobile device may include at least one processor; and a memory storing software instructions executable by the at least one processor. The software instructions, when executed by the at least one processor, may cause the apparatus to: receive, from the mobile device, prior to the cellular communication network receiving cellular communication from the mobile device, requested values of the one or more cellular connection settings for a cellular connection between the cellular communication network and the mobile device; determine approved values of the one or more cellular connection settings; communicate the approved values of the one or more cellular connection settings to the mobile device prior to the cellular communication network receiving cellular communication from the mobile device; and communicate the approved values of the one or more cellular connection settings to a radio access network of the cellular communication network for use in establishing the cellular connection.

In some embodiments of the apparatus, at least one of the approved values for a first cellular connection setting may be the same as the requested value for the first cellular connection setting. In some embodiments of the apparatus, at least one of the approved values for a first cellular connection setting may be different than the requested value for the first cellular connection setting.

In some scenarios, the apparatus may be or may be, or include, or be included within, an HSS, such as the HSS 408.

A method for establishing a cellular network connection for a link budget limited cellular communication device may be performed by a mobile device, such as the companion device 512. The mobile device may receive, from the link budget limited cellular communication device, one or more cellular connection settings with respective requested values for a cellular connection between the cellular network and the link budget limited cellular communication device. The mobile device may also transmit, to a cellular network, the one or more cellular connection settings with the respective requested values. The mobile device may also receive, from the cellular network, the one or more cellular connection settings with respective approved values for the cellular connection. The mobile device may also transmit, to the link budget limited cellular communication device, one or more cellular connection settings with the respective approved values.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106, a secondary device 107, or any one or more of the servers or systems illustrated in any of the figures) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A network node of a cellular network comprising:
   at least one processor; and
   at least one memory storing software instructions that, when executed by the at least one processor, cause the network node to:
   receive from a link budget limited cellular communication device, prior to initiation of a cellular connection between the link budget limited cellular communication device and a base station of the cellular network, requested values of one or more cellular settings for the cellular connection;
   determine approved values for the one or more cellular settings in response to receiving the requested values of the one or more cellular settings from the link budget limited cellular communication device,
   communicate the approved values for the one or more cellular settings to the link budget limited cellular communication device, prior to initiation of the cellular connection; and
   communicate the approved values for the one or more cellular settings to the base station of the cellular network, prior to initiation of the cellular connection.

2. The network node of claim 1,
   wherein at least one of the approved values for a first cellular setting is the same as the requested value for the first cellular setting.

3. The network node of claim 1,
   wherein at least one of the approved values for a first cellular setting is different than the requested value for the first cellular setting.

4. The network node of claim 1,
wherein the receiving the requested values from the link budget limited cellular communication device comprises receiving the requested values via a provisioning server and the communicating the approved values to the link budget limited cellular communication device comprises communicating the approved values via the provisioning server.

5. The network node of claim 1,
wherein the requested values are selected to improve efficiency of establishing the cellular connection.

6. The network node of claim 1,
wherein the receiving the requested values from the link budget limited cellular communication device and the communicating the approved values to the link budget limited cellular communication device are performed over a non-cellular connection.

7. The network node of claim 1,
wherein the receiving the requested values from the link budget limited cellular communication device and the communicating the approved values to the link budget limited cellular communication device are performed via a mobile device acting as a proxy for the link budget limited cellular communication device, the mobile device having a previously established cellular connection with the base station of cellular network.

8. A method for establishing a cellular connection for a link budget limited cellular communication device, the method comprising:
by a node of a cellular network:
receiving from the link budget limited cellular communication device, prior to initiation of a cellular connection between the link budget limited cellular communication device and a base station of the cellular network, requested values of one or more cellular settings for the cellular connection;
determining approved values for the one or more cellular settings in response to receiving the requested values of the one or more cellular settings from the link budget limited cellular communication device;
communicating the approved values for the one or more cellular settings to the link budget limited cellular communication device, prior to initiation of the cellular connection; and
communicating the approved values for the one or more cellular settings to the base station of the cellular network, prior to initiation of the cellular connection.

9. The method of claim 8,
wherein at least one of the approved values for a first cellular setting is the same as the requested value for the first cellular setting.

10. The method of claim 8,
wherein at least one of the approved values for a first cellular setting is different than the requested value for the first cellular setting.

11. The method of claim 8,
wherein the receiving the requested values from the link budget limited cellular communication device comprises receiving the requested values via a provisioning server and the communicating the approved values to the link budget limited cellular communication device comprises communicating the approved values via the provisioning server.

12. The method of claim 8,
wherein the requested values are selected to improve efficiency of establishing the cellular connection.

13. The method of claim 8,
wherein the receiving the requested values from the link budget limited cellular communication device and the communicating the approved values to the link budget limited cellular communication device are performed over a non-cellular connection.

14. The method of claim 8,
wherein the receiving the requested values from the link budget limited cellular communication device and the communicating the approved values to the link budget limited cellular communication device are performed via a mobile device acting as a proxy for the link budget limited cellular communication device, the mobile device having a previously established cellular connection with the base station of cellular network.

15. A non-transitory computer-readable memory medium storing software instructions executable by a processor of a network node of a cellular network to cause the network node to:
receive from a link budget limited cellular communication device, prior to initiation of a cellular connection between the link budget limited cellular communication device and a base station of the cellular network, requested values of one or more cellular settings for the cellular connection;
determine approved values for the one or more cellular settings in response to receiving the requested values of the one or more cellular settings from the link budget limited cellular communication device,
communicate the approved values for the one or more cellular settings to the link budget limited cellular communication device, prior to initiation of the cellular connection; and
communicate the approved values for the one or more cellular settings to the base station of the cellular network, prior to initiation of the cellular connection.

16. The non-transitory computer-readable memory medium of claim 15,
wherein at least one of the approved values for a first cellular setting is the same as the requested value for the first cellular setting.

17. The non-transitory computer-readable memory medium of claim 15,
wherein at least one of the approved values for a first cellular setting is different than the requested value for the first cellular setting.

18. The non-transitory computer-readable memory medium of claim 15,
wherein the receiving the requested values from the link budget limited cellular communication device comprises receiving the requested values via a provisioning server and the communicating the approved values to the link budget limited cellular communication device comprises communicating the approved values via the provisioning server.

19. The non-transitory computer-readable memory medium of claim 15,
wherein the requested values are selected to improve efficiency of establishing the cellular connection.

20. The non-transitory computer-readable memory medium of claim 15,
wherein the receiving the requested values from the link budget limited cellular communication device and the communicating the approved values to the link budget limited cellular communication device are performed via a mobile device acting as a proxy for the link budget limited cellular communication device, the mobile device having a previously established cellular connection with the base station of cellular network.

* * * * *